E. CHAQUETTE.
Machine for Raising Tailings in Mines.
No. 222,381.         Patented Dec. 9, 1879.
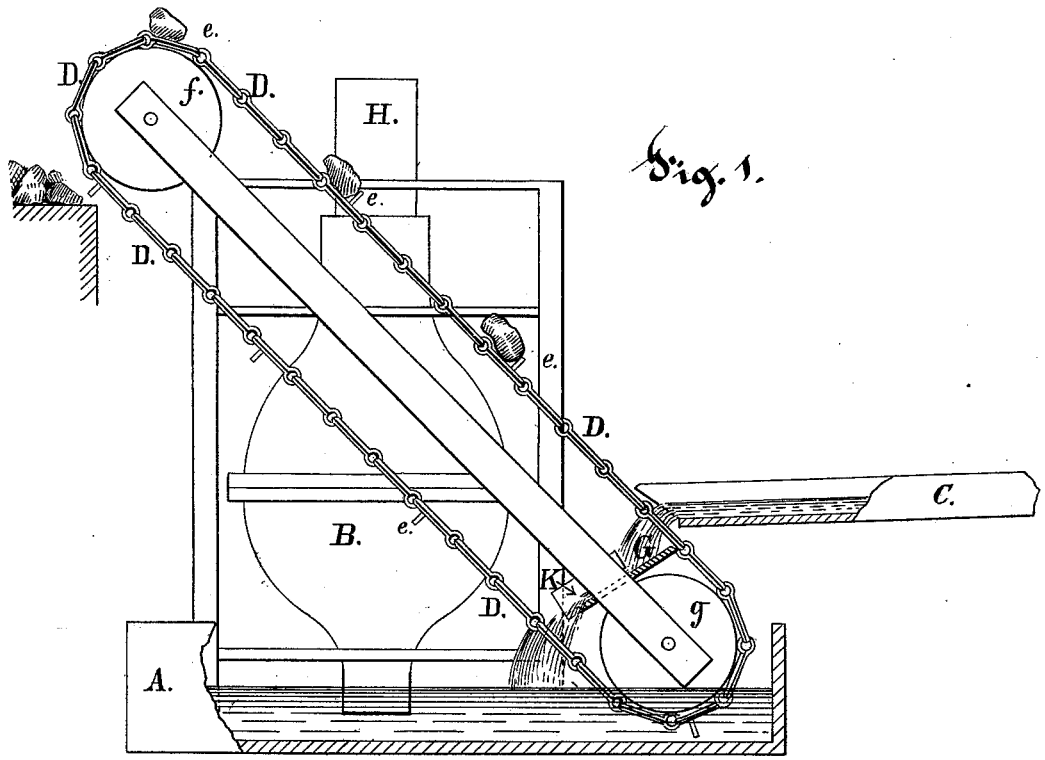
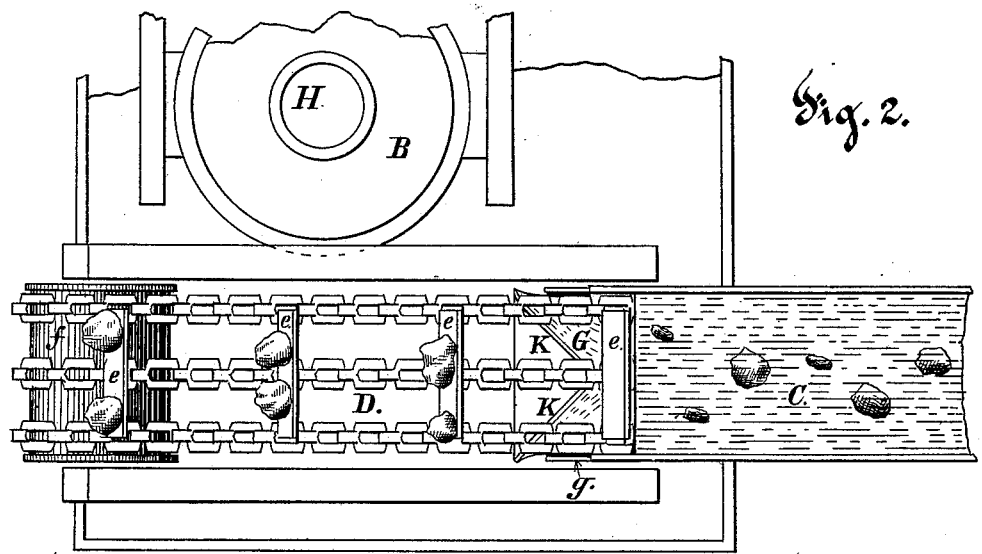

UNITED STATES PATENT OFFICE.

EPHRAIEM CHAQUETTE, OF SAN FRANCISCO, CALIFORNIA.

IMPROVEMENT IN MACHINES FOR RAISING TAILINGS IN MINES.

Specification forming part of Letters Patent No. 222,381, dated December 9, 1879; application filed May 17, 1879.

*To all whom it may concern:*

Be it known that I, EPHRAIEM CHAQUETTE, of the city and county of San Francisco, State of California, have invented an Improved Machine for Raising Tailings from Mines; and I do hereby declare that the following is a full, clear, and exact description thereof, reference being had to the accompanying drawings, forming a part of this specification.

My invention relates to an improved machine for elevating the washings and sluicings in hydraulic mines from one level to another, and it is chiefly intended for raising the sluiced material out of excavations from which it is impossible or inconvenient to conduct it through a flume.

My invention consists in first straining the material so as to separate the large rocks and coarser particles from the water and finer particles, and then raising the portion which passes through the strainer by means of a pump, while the larger particles are raised by a separate elevator.

The strainer which I use is an endless chain, which is provided with buckets, so that it serves both as a strainer and elevator.

Referring to the accompanying drawings, Figure 1 is an elevation, and Fig. 2 is a plan view, of my machine.

In the bottom of the excavation where the machine is to be placed I dig a hole or cavity, into which the curb A is to be set. The pump B, which raises the water and finer particles to the upper level, is mounted above this curb, so as to take its suction from it.

I can use any suitable pump or water-elevator that will raise small particles of earthy matter with the water; but I prefer to employ the centrifugal pump, for which I have made a contemporaneous application for Letters Patent.

C is the sluice, into which the material is washed by the hydraulic stream, and by which it is conducted to the curb A. This sluice terminates at a point above the bottom of the curb, and an endless chain, D, is mounted at its lower end at an angle to it, and in the same line, so that the lower end of the endless chain will pass below and across the lower end of the sluice. This endless chain is as wide as the sluice, and is long enough to reach to and above the upper level. It is made with interstices or openings in it, so that it will serve as a strainer for the material that flows against it from the end of the sluice, and it has buckets *e e* secured to it at intervals, which pick up the large stones that lodge against it, as hereinafter described. This endless chain or straining-belt passes over a roller or pulley, *f*, at the top and around another, *g*, at the bottom, and it is driven by any suitable power, though I shall usually employ a water-wheel and hydraulic power for driving both the endless chain and pump.

G is an inclined apron, which is mounted between the two parts of the belt or chain, just below the end of the sluice; and K is a V-shaped partition, which is secured upon it, so as to direct the material which passes through the upper side of the chain-belt to either side, and thus prevent it from falling upon the under side of the belt. The material then flows from this apron into the curb A.

The operation is then as follows: The hydraulic stream that disintegrates the earth in the excavation washes the material into the sluice C, down which it flows to its lower end. Here it is carried against the upward-moving perforated or chain belt D. The water and finer particles pass readily through the interstices in the chain or belt, while the particles that are too large to pass through lodge against the belt and are caught by the buckets *e e* and carried upward to the upper level, where they are dumped off into the upper flume. The water and finer particles that pass through the chain or belt fall into the curb, and are sucked up and forced upward by the pump B through the vertical pipe H into the flume on the upper level. This preliminary straining permits me to pass the water and finer material through an ordinary pump, and at the same time I get rid of the large rocks and bowlders that would otherwise accumulate and be a nuisance in the mine.

Having thus described my invention, what I claim, and desire to secure by Letters Patent, is—

1. In combination with a pump, B, for elevating water mixed with earthy matter, the inclined endless screening-belt D, for arresting the particles that are too large to pass through the pump, substantially as above specified.

2. The endless chain or perforated belt D, interposed between the pump B and sluice C, and provided with buckets e e, substantially as and for the purpose above described.

3. The pump B, mounted so as to take its suction from a curb, A, which is lower than the sluice C, in combination with the moving inclined strainer D', substantially as and for the purpose specified.

In witness whereof I have hereunto set my hand and seal.

EPHRAIEM CHAQUETTE. [L. S.]

Witnesses:
 W. FLOYD DUCKETT,
 W. F. CLARK.